United States Patent [19]  [11] 4,179,301
Buljan  [45] Dec. 18, 1979

[54] SI$_3$N$_4$ CONTAINING INTERGRANULAR PHASE NUCLEATING AGENT AND METHOD

[75] Inventor: Sergej-Tomislav Buljan, Acton, Mass.

[73] Assignee: GTE Sylvania Incorporated, Stamford, Conn.

[21] Appl. No.: 1,641

[22] Filed: Jan. 8, 1979

[51] Int. Cl.$^2$ .................. C04B 35/58; C04B 35/04; C04B 35/50
[52] U.S. Cl. ........................... 106/73.5; 106/73.2; 106/73.4
[58] Field of Search ............... 106/73.5, 73.2, 73.4

[56] References Cited

U.S. PATENT DOCUMENTS

| 3,830,652 | 8/1974 | Gagge | 106/73.2 |
| 3,969,125 | 7/1976 | Komeya et al. | 106/73.2 |
| 4,073,845 | 2/1978 | Baljan | 106/73.2 |

FOREIGN PATENT DOCUMENTS 2258762  6/1974  Fed. Rep. of Germany .......... 106/73.5

Primary Examiner—O. R. Veritz
Assistant Examiner—Mark Bell
Attorney, Agent, or Firm—John C. Fox

[57] ABSTRACT

Polycrystalline ceramic bodies of Si$_3$N$_4$ when prepared with a nucleating agent to obtain an intergranular phase which is substantially crystalline, exhibit improved mechanical strength at elevated temperatures over bodies having a glass-containing intergranular phase.

14 Claims, No Drawings

Si3N4 CONTAINING INTERGRANULAR PHASE NUCLEATING AGENT AND METHOD

FIELD OF THE INVENTION

This invention relates to polycrystalline ceramic bodies of $Si_3N_4$, and more particularly relates to such bodies having a nucleating agent to obtain a substantially crystalline intergranular phase, and also relates to a method for preparing such bodies.

PRIOR ART $Si_3N_4$ powder characterized by cation impurities of 0.1 weight percent or less, a morphology of predominately crystalline alpha phase and/or amorphous phase and fine particle size (3 microns or less average particle size as determined by B.E.T.), when consolidated with an additive such as MgO or $Y_2O_3$ and sintered, is known to enable production of polycrystalline bodies approaching theoretical density. See U.S. Pat. No. 4,073,845, issued to S. T. Buljan, et al. on Feb. 14, 1978, and assigned to the present assignee. Such powders may be consolidated into dense bodies by either hot pressing at less severe temperature and pressure conditions than are necessary with some less pure and less reactive powders, or by cold pressing and sintering, which is not possible with some less pure and less reactive powders. In the fabrication of such polycrystalline bodies, up to 25 weight percent of magnesium oxide or yttrium oxide is typically added as a sintering or densifying aid. In addition, from about 2 to about 4 weight percent each of $SiO_2$ and $Al_2O_3$ may be present as impurities.

In addition, some workers in the prior art have intentionally added impurity materials other than the primary densification aid. See M. Mitomo, "Sintering of $Si_3N_4$ with $Al_2O_3$ and $Y_2O_3$", *Yogyo-Kyokai-Shi*, 85 (8) 408–412, 1977. Others have chosen to introduce impurities by the selection of impure starting materials. See R. W. Rice et al, "Hot Pressed $Si_3N_4$ with Zr-Based Additions", *Journal of the American Ceramic Society*, 58, (5–6) 264 (1975).

While such $Si_3N_4$ bodies exhibit excellent mechanical strength at room temperature and elevated temperatures up to about 1,000° C., significant and sometimes drastic reductions in strength occur at temperatures above 1,000° C. and particularly above 1,200° C.

In co-pending U.S. patent application Ser. No. 916,334, filed June 15, 1978, and assigned to G.T.E. Laboratories, Inc., $Si_3N_4$ bodies exhibit remarkable retention of mechanical strength at temperatures above 1,000° C. up to 1,600° C. when the intergranular phase is substantially completely crystalline.

In accordance with the teaching of that application, the crystallinity of the intergranular phase may be achieved either by controlling the composition during processing to insure the exclusion of glass stabilizing additives or impurities, or in the alternative by giving the body a post-sintering crystallization heat treatment.

In co-pending U.S. patent application Ser. No. 916,333, also filed June 15, 1978, and assigned to G.T.E. Laboratories, Inc., $Al_2O_3$ is intentionally added to aid in densification during sintering, necessitating a postsintering heat treatment to recover high temperature mechanical strength.

SUMMARY OF THE INVENTION

In accordance with the invention, a nucleating agent is employed to promote the spontaneous crystallization of the intergranular phase during formation of $Si_3N_4$ polycrystalline bodies, thus avoiding the necessity for either processing under conditions to exclude glass stabilizing impurities or subjecting the body to a post-crystallization heat treatment, and resulting in bodies having good mechanical strength at high temperature, i.e. above 1,000° C. up to 1,600° C., making such bodies useful as structural parts or components in high temperature environments, for example, vehicular and aerospace engines and structures, regenerators for industrial waste heat recovery, etc.

In accordance with an embodiment of the invention, a method is provided comprising the steps of mixing $Si_3N_4$ powder of high purity (less than 0.1 weight percent cation impurities and up to about 4 weight percent each of $Al_2O_3$ and $SiO_2$) with up to 25 weight percent of a densifying or sintering aid, and from about 100 to 1,000 parts per million of a nucleating agent, and consolidating and sintering the materials to a polycrystalline body.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The polycrystalline bodies described herein have a composite microstructure of $Si_3N_4$ grains and an intergranular phase consisting of $SiO_2$ (a natural impurity on the surface of the $Si_3N_4$ starting powder or purposely introduced as a glass forming additive) and the densifying additive. In addition, unintentional impurities present in the body tend to concentrate in the intergranular phase. Because the intergranular phase is substantially continuous, its characteristics profoundly affect the high temperature properties of the composite material. An amorphous or glassy second phase is highly undesirable in that silicate glasses which tend to form between the grains lead to poor mechanical strength of the $Si_3N_4$ body above about 1,200° C. As used herein, the terms "crystalline" and "polycrystalline" describe a solid composed of atoms, ions, or molecules arranged in a pattern which is repetitive in three dimensions and exhibits distinct x-ray diffraction intensity peaks characteristic of the crystal structure, while "glass", "glassy" or "amorphous" means a short range order solid as indicated by its lack of x-ray diffraction intensity peaks and by broad infrared absorption peaks.

Certain impurities in the starting raw material powders, or introduced during processing prior to consolidation which are at present in $Si_3N_4$ bodies as oxides (such as $Al_2O_3$), and which are soluble in the silicate second phase will stabilize this intergranular phase in its amorphous state by offering hindrance to the reorganization process which allows crystallization. It is therefore desirable for these powders to be processed into polycrystalline bodies in such a way that the intergranular phase undergoes full crystallization during cooling from the sintering temperature, whereby a considerably more refractory intergranular phase is obtained which in turn leads to significantly enhanced high temperature mechanical strength above 1,000° C. up to 1,600° C., as is shown in copending U.S. patent application Ser. No. 916,334, referred to above.

While the invention applies to bodies containing one or more densifying additives up to about 25 weight percent, (known additives including for example MgO, CrN, $Y_2O_3$, $La_2O_3$, $ZrO_2$, ZrN, $HfO_2$, $CeO_2$, $Al_2O_3$ and $SiO_2$, it is preferred to employ MgO in the amount of up to about 5 weight percent or $Y_2O_3$ up to about 20 weight percent.

In accordance with the invention, spontaneous nucleation of the intergranular phase is facilitated by the presence of from 100 to 1,000 parts per million of one or more nucleating agents, preferably at least 300 parts per million. Such necleating agents may be added in elemental form e.g., Fe, Ti, or as oxides, nitrides, etc, eg., $TiO_2$, TiN, $Fe_2O_3$.

The $Si_3N_4$ starting material may be amorphous material, amorphous material which has been partly crystallized by heat treatment, or may be a mixture of substantially completely amorphous material and substantially completely crystalline material. A method for obtaining the $Si_3N_4$ powder of the requisite purity, morphology and particle size is described in detail in U.S. patent application Ser. No. 625,330, filed Oct. 23, 1975, assigned to the present assignee and now abandoned.

To prepare powder compositions for consolidation, $Si_3N_4$ powders are typically mixed with a densification aid by ball milling. The milling may be done wet and/or dry. If milling is not performed using $Si_3N_4$ media milling could result in contamination of the powder mixture by abrasion of the milling container and milling media surfaces. For example, powders milled with $Al_2O_3$ media show a total of up to 4 weight percent $Al_2O_3$ added to the batch during milling.

Bodies may be prepared by hot pressing, hot isostatic pressing, or by any pressureless sintering step preceded by a suitable consolidation step such as dry pressing, isostatic pressing, extruding, slip casting, injection molding, etc. See U.S. Pat. No. 4,073,845 for a general procedure for pressureless sintering of $Si_3N_4$ bodies and copending U.S. patent applicaton Ser. No. 916,334 for a general procedure for hot pressing.

EXAMPLE

In order to prepare batches for pressing of powder compacts $Si_3N_4$ powder plus 20 weight percent of $Y_2O_3$ with or without 300 ppm Ti in the form of TiN was mixed with toluene, methanol and magnesium sterate in the amounts shown in Table I.

TABLE I

| | |
|---|---|
| $Si_3N_4$ + (20 w/o $Y_2O_3$) | 68 g |
| Toluene | 159.8 g |
| Methanol | 5.44 g |
| Magnesium stearate | 2.04 g |

The batches were then thoroughly mixed by milling in a two quart polyethylene jar with about 2,000 grams of a grinding media for ½ hour. The resulting slurry was dried at about 105° C. and the dried batch was dry ball milled in a polyethelene jar for 24 hours. To this dry ball milled batch was added 2.04 grams of carbowax, 68 grams of toluene, and 2.04 grams of methanol. It was mixed by ball milling for 15 minutes. The resulting slurry was dried at 105° C. and screened through a 60 mesh screen. The minus 60 mesh fractions were pressed at 25,000 psi to obtain green powder compacts. The magnesium stearate and carbowax binders were then removed by heating the compacts at the rate of about 50° C. per hour to a temperature of about 600° C. and maintained at the temperature for about 4 hours in air.

Compacts were then sintered for 1.5 and cooled at the rate of 500° C./hour at 1700° C., and evaluated by measuring density and modulus of rupture. Results are shown below:

TABLE II

| | Density % Theoretical | Modulus of Rupture $10^3$ psi | | |
|---|---|---|---|---|
| | | 25° C. | 1200° C. | 1400° C. |
| $Si_3N_4$ + 20 w/o $Y_2O_3$ + 300 ppm Ti (TiN) | 98.2 | 98 | 72 | 38 |
| $Si_3N_4$ + 20 w/o $Y_2O_3$ | 98.0 | 101 | 67 | 19 |

As can be seen from the data the body containing Ti (TiN) shows much improved high temperature strenth.

While there has been shown and described what are at present considered the preferred embodiments of the invention, it will be obvious to those skilled in the art that various changes and modifications may be made therein without departing from the scope of the invention as defined by the appended claims.

I claim:

1. A polycrystalline ceramic body consisting essentially of a first phase of $Si_3N_4$ grains, and a second crystalline intergranular phase comprising $SiO_2$ and at least one densifying additive, characterized in that the body additionally contains from 100 to 1,000 parts per million of at least one nucleating agent selected from the group consisting of Ti, Fe, and the oxides and nitrides of Ti and Fe to facilitate substantially complete crystallization of the intergranular phase.

2. The body of claim 1 wherein the body contains at least 200 parts per million of the nucleating agent.

3. The body of claim 1 wherein the densifying additive is selected from the group consisting of $Al_2O_3$, MgO, $Y_2O_3$, $La_2O_3$, $HfO_2$, $SiO_2$, $CeO_2$, CrN, $ZrO_2$ and ZrN.

4. The body of claim 3 wherein the densifying additive is selected from the group consisting of $Al_2O_3$, MgO and $Y_2O_3$.

5. The body of claim 4 wherein $Al_2O_3$ is present in the amount of up to about 4 weight percent.

6. The body of claim 5 wherein MgO is present in the amount of up to about 5 weight percent.

7. The body of claim 5 wherein $Y_2O_3$ is present in the amount of up to about 20 weight percent.

8. A method for producing a polycrystalline body consisting essentially of a first phase of $Si_3N_4$ grains and a second crystalline intergranular phase comprising $SiO_2$ and at least one densifying additive, the method comprising consolidating particulate starting materials and sintering the consolidated materials, the method characterized by adding at least one nucleating agent selected from the group consisting of Ti, Fe, and the oxides and nitrides of Ti and Fe in the amount of about 100 to 1,000 parts per million to the materials prior to consolidation to facilitate substantially complete crystallization of the intergranular phase.

9. The method of claim 8 wherein the nucleating agent is added in the amount of at least about 200 parts per million.

10. The method of claim 8 wherein the densifying additive is selected from the group consisting of $Al_2O_3$, MgO, $Y_2O_3$, $La_2O_3$, $CeO_2$, $HfO_2$, $SiO_2$, CrN, $ZrO_2$ and ZrN.

11. The method of claim 10 wherein the densifying additive is selected from the group consisting of $Al_2O_3$, MgO and $Y_2O_3$.

12. The method of claim 11 wherein $Al_2O_3$ is present in the amount of up to about 4 weight percent.

13. The method of claim 12 wherein MgO is present in the amount of up to about 5 weight percent.

14. The method of claim 12 wherein $Y_2O_3$ is present in the amount of up to about 20 weight percent.

* * * * *